UNITED STATES PATENT OFFICE.

PRYOR LEA, OF GOLIAD, TEXAS.

IMPROVEMENT IN MIXING MINERAL AND FOSSIL SUBSTANCES WITH BITUMINIZED CLAY TO FORM A PLASTIC MATERIAL.

Specification forming part of Letters Patent No. 144,397, dated November 11, 1873; reissue No. 7,319, dated September 26, 1876; application filed August 29, 1876.

*To all whom it may concern:*

Be it known that I, PRYOR LEA, of Goliad, in the county of Goliad and State of Texas, have invented a new and Improved Mode or Process of Mixing Mineral and Fossil Substances with Bituminated Clay; and I do hereby declare that the following is a full, clear, and exact description thereof.

The first step is to procure a very fluid composition, of which bitumen shall be the primary ingredient; and it shall be diluted so that it may readily receive and immerse the firm materials. The necessary fluidity may be attained by means of a liquid naturally bituminated, or by addition of water. The proportion of bitumen to the other firm materials will depend on the kind of bitumen used and the object for which the compound is desired, while the proportion of bitumen in the prepared fluid will regulate the percentage of bitumen to be used in connection with the other firm materials, the bitumen not exceeding ten percentum of the proposed amount of the finished composition, and the other firm materials being sufficient to approximate saturation of the fluid composition. The ingredients of this fluid should be thoroughly intermixed by stirring immediately preceding the introduction of the firm materials, to secure diffusion of the bitumen with uniformity throughout the finished composition.

The second step is to prepare the firm materials to be incorporated with the bitumen. These must be clay, with its incidents and mineral or fossil substance, or both combined. The clay must be proportioned to the bitumen so that they, in connection with the fluid, shall make a tenacious and plastic cement; and the quantity of such cement must be sufficient to facilitate the combining and compacting and fixing of the hard materials. In other respects the proportions of all ingredients may be subject to election. The clay must be pulverized, and any mineral or fossil substance must also be pulverized or granular, and all must be thoroughly intermixed and well dried.

The third step is to embed the firm materials in the prepared fluid until a homogeneous mixture is obtained and every particle of the firm materials is immersed, and the consistency is suitable for molding or for plastering.

The fourth and last step is to exclude the diluent element and to compact the remainder, which twofold object is attained partly by evaporation and partly by the application of considerable pressure, these operations being alternate and progressive until the permanent ingredients, as a mass, shall have become as dense as desired.

The mechanical procedure being thus completed, subsequent change in the product sustains the mechanical combination and matures the mass, partly from affinity of the permanent ingredients and partly from repugnance between bituminous oil and water, whether the latter be within the mass or of the open air.

The product is a dense, durable, and economical composition, suitable for building both small and massive structures, either in tidewater or elsewhere, and for other purposes.

The product or compound differs from other products or compounds in the fact that the bitumen is carried by the fluid medium throughout the whole mass of other firm material, whether pulverized or pulverized and granular; and thus the other firm particles receive separately on themselves the cementing bitumen, which becomes combined with the other firm material, when the diluent medium is expelled by evaporation and pressure, so as to form a homogeneous and solid mass.

Having described my invention, what I claim, and desire to secure by Letters Patent, is—

The new compound or product of bitumen, clay, and mineral or fossil substance, or both mineral and fossil substances, the proportions of the bitumen and other firm material being as above stated, or thereabout.

Witness my hand in the matter of my reissue application of a patent granted November 11, 1873, for an improved mode of procedure for mixing mineral or fossil substances with bituminated clay, this 8th day of August, 1876.

PRYOR LEA.

Witnesses:
W. S. HOTCHKISS,
R. A. CHADWICK.